United States Patent [19]
Smith et al.

[11] Patent Number: 6,055,610
[45] Date of Patent: Apr. 25, 2000

[54] DISTRIBUTED MEMORY MULTIPROCESSOR COMPUTER SYSTEM WITH DIRECTORY BASED CACHE COHERENCY WITH AMBIGUOUS MAPPING OF CACHED DATA TO MAIN-MEMORY LOCATIONS

[75] Inventors: Kenneth K. Smith, Boise, Id.; Loren P. Staley, Cool; Sorin Iacobovici, San Jose, both of Calif.

[73] Assignee: Hewlett-Packard Company, Palo Alto, Calif.

[21] Appl. No.: 08/918,209

[22] Filed: Aug. 25, 1997

[51] Int. Cl.$^7$ ..................................................... G06F 12/00
[52] U.S. Cl. ........................... 711/156; 711/147; 711/207; 711/205; 711/210; 711/141; 711/168
[58] Field of Search ........................................ 711/144, 210, 711/118, 141, 156, 146, 147, 168, 205, 207, 148

[56] References Cited

U.S. PATENT DOCUMENTS

| | | | |
|---|---|---|---|
| 5,809,539 | 12/1996 | Young et al. | 711/144 |
| 5,813,030 | 5/1997 | Tubbs | 711/118 |
| 5,848,434 | 12/1996 | Young et al. | 711/144 |
| 5,893,142 | 11/1996 | Moyer et al. | 711/125 |

*Primary Examiner*—Eddie P. Chan
*Assistant Examiner*—Kimberly N. McLean

[57] ABSTRACT

A distributed-memory multiprocessor system uses fast and main coherency directories to implement cache coherency. The main directory is stored with user data in main memory and includes sufficient information to determine which memory cells have cached copies of user data stored in main memory. In addition, the main directories specify the states of the cached data. The fast directories cache only some of the main-directory information for only a fraction of the main-memory locations at any given time. The fast directories are tagless in one mode and use partial tags in another mode. The fast-directory information is accessed concurrently with main-directory information in response to data requests. Directory information is retrieved first from the fast directory and is used to launch predictive recalls. Subsequently received main-directory information is used to validate or invalidate the predictive recalls. If invalidated, determined recalls are issued, and memory access times are the same as they would have been without the fast directory. If validated, the predictive recalls reduce data access times. To the extent that the predictive recalls are successful, overall system performance is improved.

6 Claims, 3 Drawing Sheets

| MEMORY FORMATS | | | | | |
|---|---|---|---|---|---|
| MEMORY | LINE ADDRESS/ INDEX | TAG | STATE | SITE | USER DATA |
| MAIN (MD0) | 28+3 | 0 | 2 | 8 | 512 |
| U-CACHE (C00) | 18 | 11 | 3 | 0 | 512 |
| D-CACHE (FD0) MODE A | 21 | 0 | 1 | 3 | 0 |
| D-CACHE MODE B PRIVATE | 20 | 1 | 0 | 3 | 0 |
| D-CACHE MODE B PUBLIC | 19 | 0 | 0 | 8 | 0 |

*Figure 2*

DISTRIBUTED MEMORY MULTIPROCESSOR COMPUTER SYSTEM WITH DIRECTORY BASED CACHE COHERENCY WITH AMBIGUOUS MAPPING OF CACHED DATA TO MAIN-MEMORY LOCATIONS

BACKGROUND OF THE INVENTION

The present invention relates to computer systems and, more particularly, to cache-coherent distributed-memory multiprocessor systems. A major objective of the present invention is to provide for faster average memory access.

Much of modern progress is associated with the rapid advance of computer technology. However, no sooner are more powerful and feature-laden computers introduced than are appetites whetted for more power and more features.

Computers typically include one or more processors and memory. Computer memory stores information in the form of binary data, the basic unit of which is referred to as a "bit". Most of the data stored in memory is "user data", which includes program instructions and program data. Processors process data many bits at a time; the number of bits handled at a time defines the word size for the incorporating system. Early processors manipulated 8-bit words (one byte) at a time. 32-bit-word systems are now prevalent, and 64-bit-word systems are becoming more widely used.

A processor executes instructions, which can involve performing operations on program data. Multiprocessor systems achieve higher performance by performing concurrently tasks that a single-processor system would perform sequentially. Like single-processor systems, some multiprocessor systems address a unified main memory. However, the gains to be achieved by adding additional processors are partially offset by the latencies incurred as the processors contend for access to the unified memory.

To reduce memory contention, main memory can be distributed among two or more memory cells. Each cell contains its own memory and one or more processors. To provide compatibility with programs assuming unified memory, each processor can access not only the local memory, but also the memories of other cells via cell communications link circuitry. While access of local memory is faster than access of remote memory, all main-memory accesses are slow compared to the processor speeds.

Caching can ameliorate the performance limitations associated with memory accesses. Caching involves storing a subset of the contents of main memory in a cache memory that is smaller and faster than main memory. Various strategies are used to increase the probability that cache contents anticipate requests for data. For example, since data near a requested word in memory address space is relatively likely to be requested near in time to the requested word, most caches fetch and store multi-word lines. The number of words stored in a single cache line defines the line size for a system; for example, a line can be eight words long.

Since caches typically have far fewer line storage locations than main-memory, many main memory line addresses are associated with each cache location. Accordingly, a tag is stored at each cache location along with data to indicate uniquely the main-memory line address owning the cached data. While there are several types of caches, direct-mapped caches are the fastest since only one cache location needs to be examined for each data request.

In both single-processor and multi-processor systems, there is a challenge of ensuring "coherency" between the cache and main memory. For example, if a processor modifies data stored in a cache, the modification must be reflected in main memory. Typically, there is some latency between the time the data is modified in the cache and the time the modification is reflected in main memory. During this latency, the yet-to-be-modified data in main memory is invalid. Steps must be taken to ensure that the main memory data is not read while it is invalid.

Maintaining coherency in multi-processor systems can be especially complex since data can be stored concurrently in multiple caches. When a replica of data in one cache is modified, the corresponding data in the other caches is rendered invalid. Thus, some means is required to track which caches hold what data and to indicate when cached data is rendered invalid due to a modification of a replica of that data by another cache.

Typically, "permission" is required to modify cached data. That permission is only granted if the data is stored in exactly one cache. Data stored in multiple caches is treated as read only. Each cache line can include one or more state bits indicating whether permission is granted to modify data stored at that line. While the exact nature of the states is system dependent, there is typically a "privacy" state bit used to indicate permission to modify. If the privacy bit indicates "private", only one cache holds the data and the associated processor has permission to modify the data. If the privacy bit indicates "public", any number of caches can hold the data, but no processor can modify it.

In a multiprocessor system, for a processor desiring to read or modify data, there must be a way to determine which caches, if any, have copies of the data and whether permission is given for modification of the data. "Snooping" involves examining the contents of multiple caches to make the determination. If the requested data is not found in the local cache, remote caches can be "snooped". Recalls can be issued to request that private data be made public so that another processor can read it, or recalls can be issued to invalidate public data in some caches so that another cache can modify it.

The communications bandwidth involved in snooping scales more than linearly with the number of caches to be snooped. For large numbers of processors and caches, exhaustive snooping impairs performance. For this reason, some distributed-memory multiprocessor systems snoop within cells and rely on directory-based cache coherency for intercell coherency.

In a distributed-memory system employing directory-based cache coherency, the main memory of each cell associates a directory entry with each line of memory. Each directory entry identifies the cells caching the line and whether the line of data is public or private. Snooping is used to determine which cache within a cell has the data. Thus, each cell contains a directory indicating the location of cached copies of data stored in its main memory.

For example, in an 8-cell system, each directory entry would be 9 bits long. For each of the cells, a respective "site" bit indicates whether or not that cell contains a cached copy of the line. The $9^{th}$, "privacy", bit indicates whether the data is held privately or publicly. A change of state to "private" is indicated first in the coherency directory for the cell owning (storing in main memory) the data; a change of state to public is indicated in the cache first. At other times, for a given line of data, its privacy state as indicated in a cache matches its privacy state as indicated in coherency directory. To avoid coherency problems, the cache privacy bit is precluded from indicating "private" while the corresponding privacy bit in a coherency directory indicates "public".

When data is requested from main memory, the associated coherency directory must be examined to determine whether a recall is necessary. Since the recall must be completed after main memory is accessed and before the data request is met, some memory accesses are slower than they would be in a cacheless system. Because the caches reduce the number of main-memory accesses, overall performance is generally improved. However, with the insatiable demand for computing power, further improvements in performance are desired.

SUMMARY OF THE INVENTION

In the course of the present invention, it was determined that for certain types of user programs, e.g., large databases, recalls following main memory accesses are frequent enough to significantly impair performance of distributed-memory multiprocessor systems with four or more cells. Furthermore, the impairment scales more than linearly with the number of cells. Thus, the larger the system, the greater the need to address this performance impairment.

One solution considered is to store the main directory in faster memory than main memory. However, the cost of providing SRAMs large enough to store an entire coherency directory appears commercially infeasible. Accordingly, the present invention provides fast coherency directories containing some, but not all, of the information in the main coherency directories.

Each fast directory is accessed concurrently with its respective main directory. Because information can be retrieved from the fast directory sooner than it can be retrieved from the main directory, some recalls can be initiated before main-memory access is completed. To the extent that these recalls are correctly issued, the frequency with which recalls are issued following a main memory access is reduced. Thus, overall system performance is enhanced. Required recalls not indicated by the fast directory can be issued once the main-directory data is retrieved.

To take cost-effective advantage of relatively fast-but-expensive memory devices (e.g., SRAM versus DRAM), the fast directory should be much smaller than the main directory. The fast directory can be shallower, i.e., represent fewer lines than the main directory, or it can be narrower than the main directory, i.e., contain fewer bits per line represented, or, preferably, both.

In the case the fast directory is shallower than the main directory, it is preferably operated as a cache, so that the lines represented are varied according to usage. While caches typically require tags to be stored with user data, the present invention provides for caches without tags or with incomplete tags. This helps narrow the fast directory, permitting more lines to be represented for a given cache memory capacity.

A cache with incomplete tags would be unthinkable for most applications. Omitting one tag bit converts a certain mapping (of cached data to a main-memory address) to an ambiguous mapping (of cached data to two main-memory addresses). Each additional tag omitted doubles the ambiguity. For example, if a direct-mapped cache having $2^{20}$ (1M) locations is used with a main memory having $2^{26}$ (64M) locations, 6 tag bits are required to indicate the main-memory location actually storing the data uniquely. If any of these tag bits are omitted, it will be uncertain which of two main-memory locations are represented. If all six tag bits are omitted, it will be uncertain which of 64 main-memory locations are represented.

On the other hand, omitting the tag bits can double or even quadruple the number of cache locations for a given cache-memory size, and thus half or quarter the ambiguity. Thus, a 64-way ambiguity may be reduced to a 32-way or 16-way ambiguity. Furthermore, if the caching strategy is at all effective, all addresses are not represented with equal probability. The probability that a requested address is the one represented in the cache is higher than the average probability of representation for the memory locations mapped to the same cache index.

Thus, there is justification for presuming that it is the requested address that is represented in the cache. The invention initiates recalls based on this presumption. Since it is uncertain that the fast-directory data in fact applies to the requested address, the recalls are predictive, rather than determinative. If the requested address is actually the address represented in the fast directory, the recall is successful and the recalls are completed before they would have been if the recall had to be based on main-directory data.

Unsuccessful recalls are substantially innocuous; erroneous user data is not substituted for correct user data. Some cache states will be unnecessarily changed from valid to invalid or from private to public. While wasteful and potentially time consuming, these unnecessary state changes do not affect user data values. Furthermore, once the main-directory data is retrieved, corrective action can be taken to reset the states, at least in some cases. Also, once the main-directory data is retrieved, the correct recalls can be issued. In no case is a memory access longer than it would be without the fast directory.

The main cost of the unsuccessful recalls is additional communications traffic. This additional traffic primarily affects the address paths. Address paths tend to be underutilized relative to data paths, so there is typically some communications bandwidth available for the superfluous recalls. Nonetheless, steps can be taken to minimize the superfluous recalls.

Inclusion of more tag bits is one way to reduce superfluous recalls.

While this is not considered worthwhile if it results in a reduction of cache locations, there are situations in which adding a tag bit does not result in such a reduction.

Fast-directory data can be checked against snoop data (from the requestor or owner cell) for consistency before recalls are issued. If the retrieved fast-directory data is inconsistent with the snoop data, any predictive recalls indicated by the fast-directory data are not issued.

Cost considerations aside, the preferred approach to reducing superfluous recalls is to increase the number of fast-directory locations. Increasing the number of fast directory locations not only reduces the number of superfluous recalls, but also, and more importantly, increases the number of successful recalls. In the extreme, the present invention provides a fast directory in which the number of directory locations equals the number of main-memory addresses to be represented memory cells (the directory ceases to be a cache). In this case, there are no ambiguities regarding the represented address.

For a given fast-directory size in bits, increasing the number of storage locations requires reducing the number of bits to be stored per location. Since memory devices are more available and cost effective in certain configurations, some entry-width reductions are more valuable than others are.

Reducing the number of bits per entry is basically a compression problem. Information useful in generating valid predictive recalls is retained at the expense of less useful or redundant information.

Information readily available elsewhere, from local snoops, need not be duplicated in the fast directory. For example, all situations for which no recall is indicated can be represented by a single code. In some cases, a tradeoff can be made between a more compact directory expression and the accuracy of predictive recalls.

The relative importance of information is not only germane to directory compression, but also to the caching strategy. For the purposes of making predictive recalls, it might be effective to refuse to write less recent valuable data with more recent less-valuable data. For example, an effective cache strategy might prohibit an entry indicating the cell in which private data is cached from being overwritten by data indicating idle data (assuming the latter could be represented in the cache).

In many systems, attempted reads of private data are much more common than attempted writes of shared (public and not idle) data. A substantial performance improvement over a system without a fast directory can be obtained by caching only private data. Private data is a good candidate for caching since it can be determinatively represented in fewer bits than can public data (3 bits versus 8 bits for eight).

A sectioned fast directory can be used to handle two or more states without storing state bits. For example, a fast directory can include a "private" section for private data and a "public" section for public data. A state bit is not required since the section in which the data is stored determines state. More sections can be used to reduce the number of bits stored per cache location.

An important advantage of the sectioned directory is that the sections need not have the same dimensions. More locations can be allocated to the private section since private data tends to be more useful for issuing recalls. More bits per location can be used for the public data to specify more fully the cells caching that data. For example, for an eight cell system, 3 site bits can be used for the private section, while 8 site bits can be used for the public section. In a 16-cell system, four site bits can be used for the private section, and 8 site bits can be used for the public section; in this case, predictive recalls of public data are issued to cells in pairs.

In a sectioned cache, each section is generally examined for each data request, whereas only one location needs to be examined for an unsectioned cache. If the information from the two sections differs, two sets of recalls can be issued.

Due to the incomplete nature of the information stored in a fast directory, some fast-directory data can be more useful than other fast-directory data. For example, fast-directory data indicating that user data is privately held and indicating the location at which the user data is privately held can be used to issue a single predictive recall. Fast directory data indicating that data is idle results in no predictive recalls, and thus no performance enhancement. Accordingly, the present invention provides a fast-directory update algorithm in which the utility of data is taken into account. For example, even if more recent, data indicating data is idle would not replace data indicating that data is privately held. In other words, the decision whether to replace one fast directory with another is based in part of the nature of the predictive recalls that would be issued if data represented at the respective fast directory location were requested. This strategy differs considerably from conventional cache update algorithms that are content neutral.

A method of handling a read request involves issuing the read request, checking if it could be met within the requestor cell, and then, in the negative case, forwarding the request to the owner cell. The owner cell concurrently performs a local snoop, accesses the fast directory, and initiates access of the main directory. The snoop data and fast-directory data are correlated to determine whether a recall is indicated. The recall begins before data is retrieved from the main directory.

Once the main-directory data is available, the coherency data retrieved from the fast directory can be confirmed or disconfirmed. If disconfirmed, any initiated recalls can be aborted or reversed. In that case, a deterministic recall can be initiated so that the access time is the same as it would be without the fast directory. The data is then provided to the requesting processor, states are updated, and the fast directory is updated based on its content-based update algorithm. Where the fast-directory data is confirmed, access times are improved. Write requests are handled similarly, except that the recalls involve making public data private so more than one cell may be subject to recall per request.

The present invention cost effectively reduces the frequency of recalls following main-directory accesses. Thus computer performance is generally improved. For the preferred tagless cache embodiments, there are several approaches to minimizing the number of inaccurate predictive recalls. Compression of directory information permits more directory locations per unit cache size, increasing the likelihood of successful predictive recalls and decreasing the frequency of inaccurate predictive recalls. These and other features and advantages of the invention are presented in the detailed description below with reference to the following drawings.

BRIEF DESCRIPTION OF THE DRAWINGS

FIG. 2 is a table indicating memory formats for the memories, data caches, and directory caches of the system of FIG. 1.

DESCRIPTION OF THE PREFERRED EMBODIMENTS

Figure 1:
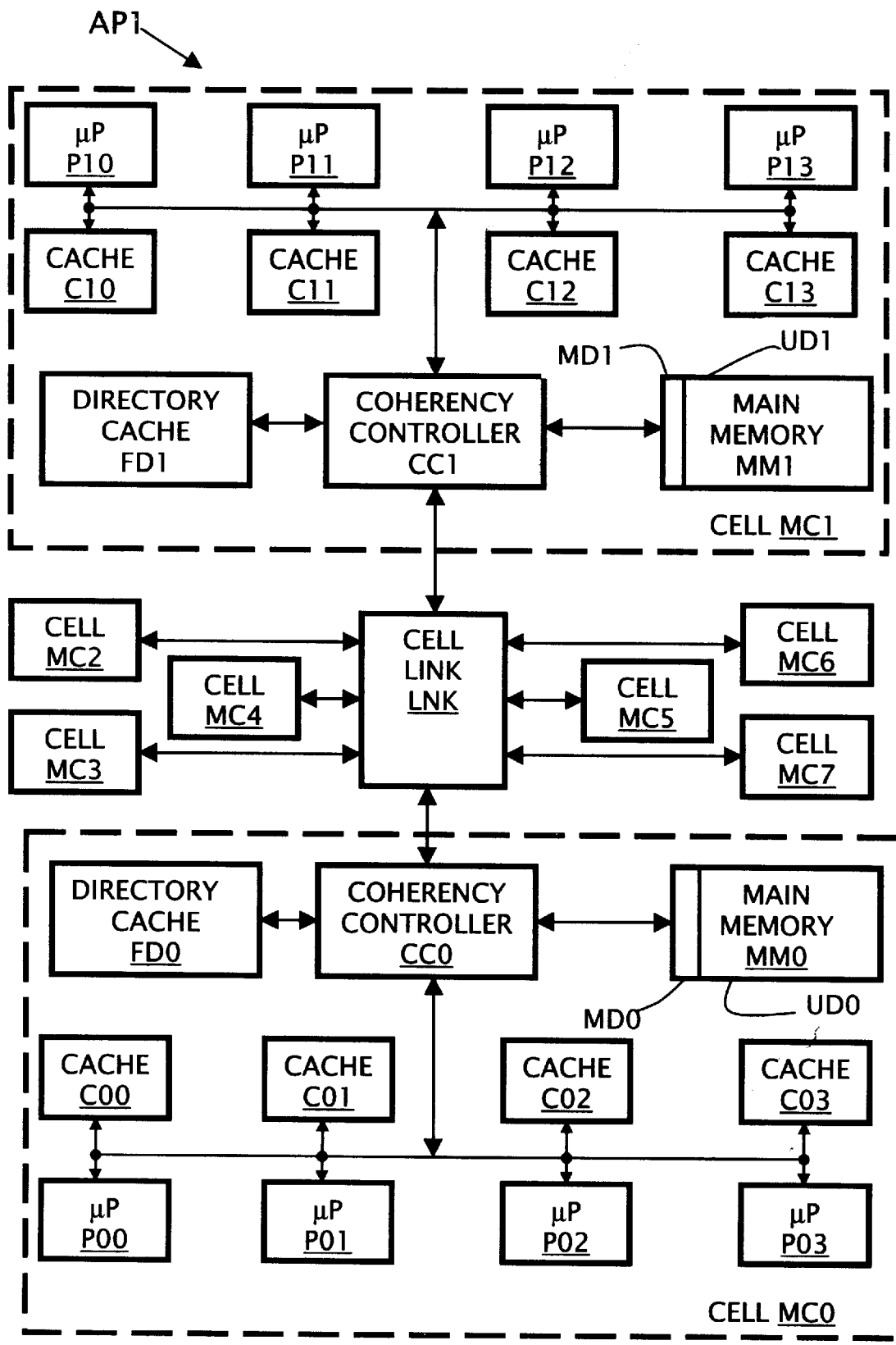
FIG. 1 is a block diagram of a distributed-memory multiprocessor computer system employing directory-based cache coherency in accordance with the present invention.

In accordance with the present invention, a distributed-memory multi-processor system AP1 with directory-based cache coherency comprises eight memory cells MC0–MC7 communicatively coupled via a cell communications link LNK, as shown in FIG. 1. Memory cell MC0 includes four processors P00–P03, four user-data caches C00–C03, main memory MM0, a fast coherency directory FD0, and a coherency controller CC0. Likewise, memory cell MC1 includes four processors P10–P13, four caches C10–C13, main memory MM1, a fast directory FD1, and a coherency controller CC1. Memory cells MC2–MC7 are essentially the same as memory cells MC0 and MC1.

Since the memory cells are essentially identical, a detailed description of memory cell MC0 suffices to define the structure and function of remaining memory cells MC1–MC7. User data is stored in a user data section UD0 of main memory MM0 and its counterparts, e.g., UD1, in cells MC1–MC7 for access by 64-bit processors P00 et al. Main memory MM0 has a 4 GB (gigabyte)=256 MW (megaword) capacity so that system AP1 has a total of 32 GB=4 MW of main memory distributed evenly among cells MC0–MC7.

Caches C00–C03 substantially reduce the average time required for memory accesses. When a word is fetched from main memory MM0 by processor P00, it is stored in cache C00; in addition, seven words neighboring the requested word are fetched and stored along with the requested word. The eight words so fetched are stored in a cache storage location. Thus, the line length for system AP1 is 8 64-bit words, or 512 bits.

The speed of cache C00 is attributable to its relatively small capacity and the use of fast memory. Cache C00 is a 4 MB=256 KL (kilolines) SRAM module. Such a memory can be accessed much more quickly than the multi-module DRAM devices that provide the 4 GB=256 ML (megalines) capacity for memory MM0.

The operation of cache C00 is transparent to processor P00. A request for data by processor P00 includes a 32-bit main-memory word address to distinguish among the 4 billion plus main-memory locations of system AP1. Cache C00 intercepts this address and converts it to a 29-bit line address by removing the three least-significant fats. This 29-bit line address is forwarded to coherency controller CC0 so caches C01–C03 can be snooped. If the request must be forwarded to an owner cell, coherency controller CC0 decodes the three most significant bits into a memory cell ID, forwarding the remaining 26-bit line address to the appropriate cell so that the request can be met.

In the meantime, cache C00 matches the 18 least-significant line address bits with one of the 256 kL indices used to identify respective cache locations with cache C00. The remaining eleven most significant bits of the 29-bit line address are then compared to an 11-bit tag stored at the selected cache location. In the event of a "hit", i.e., the tag matches, the three least-significant word address bits are then used to select the requested one of the eight data words stored at the address location for forwarding to processor P00. In the event of a "miss", i.e., the tag does not match, the line eventually fetched from main memory overwrites the line of data at the selected cache location; the tag at that location is updated in the process. Finally, the requested word is forwarded from the cache line to processor P00.

Coherency is implemented in part by including three state bits with each line of user data stored in cache C00. Thus, as indicated in FIG. 2, each user-data cache (U-cache in FIG. 2), stores 11 tag bits, 3 state bits, and 512 user data bits at each cache location. (Each location can also store parity or other error correction bits, but these can be ignored for present purposes). The first state bit is a "validity" bit indicating validity or invalidity of the line stored at the cache location. The second state bit is a "privacy" bit indicating whether the data stored at the cache location is public or private.

The meaning of the third "shared" bit depends on the value of the privacy bit. If the privacy bit indicates data is public, then the shared bit indicates whether or not the data is cached by another cell. Information about sharing is provided by the cell owning the data. If the privacy bit indicates the data is private, the sharing bit indicates whether the data is "dirty" or "clean". The associated processor in response to an appropriate program instruction sets this state. Private clean data can be read by the owner processor, but not modified. Private clean data can be read, but not cached by other processors. Thus, the cell holding private clean data can convert the state to private dirty without resorting to a recall to modify the data. The following table summarizes the four data states.

TABLE

Data States and Associated Actions

|  | Public | | Private | |
| --- | --- | --- | --- | --- |
|  | Shared | Unshared | Clean | Dirty |
| Local Read | Yes | Yes | Yes | Yes |
| Local Modify | No | No | No | Yes |
| Remote Read/Cache | Yes/Yes | Yes/Yes* | Yes/No | No |
| Remote Modify | No | No | No | No |

*State changes to "publi-shared" upon remote read.

In the absence of the shared bit, all "public" data would be treated as "shared", and all "private" data would be treated as "dirty". A remote read of private data would require that main memory be updated and the data state changed to public. Modification of public data would require that the data be recalled from other caches and that the data be made private.

The "shared" bit, in effect, defines two intermediate states that provide some performance advantages. Unlike shared public data, unshared public data can be made private without a recall. Unlike private data, unshared public data can be read and cached by remote processors (in which case, the state is changed to public shared) without "permission" of the local processor. Unlike dirty private data, clean private data can be read by remote processors without a state change. Unlike public data, clean private data can be protected from remote caching so that it can be modified (after being made dirty) more readily.

Upon system initialization, all cache validity bits are set to invalid. Upon a data request, if the validity bit at the cache location indexed by the requested address is set to invalid, a miss is indicated regardless of the value of the tag bits. When data is entered into a cache storage location, the validity bit is set to "valid". The validity bit can be set to "invalid" in response to a recall, as described below.

A processor can read any valid data in its cache. However, the processor can only modify data that its cache holds privately. If a processor needs to modify data that it holds publicly, the data must be made private first. If a processor needs to modify data that is not in the associated cache, the data must be entered into its cache as private. If the data is in use by another cache, the data must be recalled from that cache before it can be made private.

Snooping is used to locate copies of requested data in caches associated with other processors in the same cell. Thus, if processor P10 requests to modify data that it holds publicly, coherency controller CC1 uses snooping to effect a recall of any copies in local caches P11–P13. The recall serves to request that a privately held copy be converted to public as soon as possible and that public copies be invalidated. Once there are no outstanding copies of the data, a private copy of the data can be provided to processor P10 or its public copy can be made private. Processor P10 can then modify its private copy of the data.

Inter-cell coherency is directory based in system AP1. If a request cannot be satisfied intracell, it is forwarded to the coherency controller for the cell owning the requested data. For example, if processor P10 asserts an address within main memory MM0, then cell MC0 owns the requested data. Coherency controller CC0 is charged with finding copies of the requested data system wide. The information required for this search is maintained in a main directory that is stored on a line-by-line basis with user data. As indicated in FIG.

2, each line of main memory MM0 stores two state bits and eight site bits. The eight site bits indicate for each cell, whether it holds a copy of the line. The first state bit indicates whether the data is held publicly or privately, thus corresponding to the second cache state bit.

The second or "sharing" main-directory state bit, generally corresponds to the "sharing" state bit in the caches. The main difference is that, unlike the caches, the main directory can hold data that is uncached. The preferred embodiment simply treats uncached data as a special case of unshared public data. Thus, in the main directory, the sharing bit can distinguish cases in which data is cached by at most one cell and data that is cached by two or more cells. The sharing bit in main memory distinguishes between private dirty and private clean in the same manner as the sharing bit in the caches.

In an alternative embodiment, the second main-directory state bit distinguishes between "public idle" and "public cached" states. Public data that is held by any cache is "public cached". Data that is not cached is "idle" and public. When requested data is idle, the request can be met immediately without reference to site bits and without issuing any recalls. Any predictive recalls issued on the basis of (incorrect) fast-directory information can be aborted without requiring reference to site bits. The preferred embodiment maintains a closer correspondence between main-directory state bits and cache state bits.

Thus the privacy and sharing state bits of a cache and in the main directory generally correspond except that transitions are not simultaneous. Transitions from public to private are indicated first in the main directory, while transitions from private to public are indicated first in the cache that held the data privately. (Thus, a cache cannot treat as "private" data that the main directory and, thus, the reset of the system, treats as public.) Transitions between private dirty and private clean are indicated first at the caches, while transitions between public shared and public unshared are indicated first at the main directory.

From the data-state bits in main directory MM0, coherency controller CC0 can determine from the directory in main memory MM0 which cells of system AP1 hold copies of the requested data and whether the data is held privately or publicly. Recalls can be directed to the identified cells accordingly. Within the cells receiving the recalls, location of the data is achieved through snooping.

Fast directory FD0 permits predictive recalls to be initiated. Like user-data caches C00 etc., fast directory FD0 is relatively small (4 Mb×4=16 Mb=2 MB) relative to main memory MM0, and fast (SRAM instead of DRAM). Instead of storing user data information, fast directory FD0 stores coherency directory information that corresponds to, but is less specific than, the coherency directory information stored in the main directory MD0 of main memory MM0.

The directory data stored in fast directory FD0 is dependent on a field-configurable selection between a mode A and a mode B, indicated in FIG. 2. Mode A provides 2M 4-bit cache directory locations. One bit per location is used to store a private state bit; the other three bits encode the identity of one of cells MC0–MC7. The 2M cache directory locations serve 64M main memory locations, so that each cache directory location can store directory information for at most one of 32 main memory addresses directly mapped to it.

In mode A, fast directory FD0 is a tagless cache: as indicated in FIG. 2, no tag bits are stored by fast directory FD0 in mode A. As a result, there is no direct way to determine which of the 32 possible main-memory addresses is represented by the respective fast-directory location. Instead, the fast-directory information at the index pointed to by a requested address is presumed to apply to that address and recalls are initiated accordingly. Except as qualified below, every access of fast directory FD0 results in a hit, but the data provided can be for the wrong main-memory line address.

Recalls issued on the basis of false fast directory information do not result in user data errors. If a misguided cell MC0 requests data from cell MC2, the latter cell simply fails to find the requested data. Any errors can be corrected once the true directory information from memory MM0 is obtained. The cost of the false recalls is primarily superfluous intercell address traffic. This traffic is limited to communication between the owner cell and the presumed holder of a copy in cache.

The advantage of omitting tag data is that the memory capacity saved can be devoted to representing more lines of memory in the directory cache. If complete tags were provided for, fewer than half as many main-memory addresses could be represented at once. This would reduce the number of successful recalls, and thus reduce the performance enhancement.

The single state bit indicates whether data held in a cache is public or private. If it is private, then only one cell can have a copy of the data in cache. The three site bits in the directory cache are sufficient to uniquely identify that cell. If the data is public, zero, one, two, or three or more cells may hold it. As a first approximation, the mode A encoding can only identify one holder of a copy of the public data.

Cache controller CC0 determines coherency data for cell MC0 by snooping. Hence, directory information regarding the presence of data in owner cell caches is not required. This permits beneficial modification of the basic directory cache coding scheme.

More specifically, two self-referencing 4-bit codes are freed for specific cases. In the present case, the code 0000, which would indicate that the requested data is cached publicly by the owner cell, can be used to indicate any case in which no recall is to be issued based on directory cache information. This would cover directory cache locations that have not been written to, data that is public but idle (not stored in any cache), data that is cached only by the owner cell, and data that is shared by two or more cells other than the owner cell.

This leaves code 1000, which would indicate that the requested data is cached privately by the owner cell for some other purpose. For example, it can be used to initiate a global recall for data shared by some minimum number, e.g., 6 or 7, of cells other than the owner cell. While this would generate a lot of traffic, it would be issued infrequently and the recalls could be aborted once the main-directory information is obtained by the owner coherency controller.

Non-self-referencing codes must also be interpreted in the light of information gathered by local snooping of the owner cell. For example, code 0001 indicates that a copy of the requested data is cached by cell MC1. Owner cell snooping determines whether or not the requested data is also cached by cell MC0. In either case, no recalls are required where the requesting cell is also the owner cell (e.g., processor P00 requests data stored in memory MM0). In the cache strategy applied to fast directory FD0, non-self-referencing codes are not replaced by self-referencing codes. This prevents useful information from being overwritten by less useful information, thus achieving, on the average, a performance benefit.

Coherency controller CC0 can test fast-directory data against snoop data from the requester cell and the owner cell to reduce the number of false recalls. To this end, the requestor cell provides pertinent snoop data to the owner coherency controller. Thus, if fast directory FD0 indicates that the requested data is cached privately by cell MC2, but cell MC1 informs cell MC0 that it has a shared copy of the data, coherency controller CC0 knows that the directory information was for another memory location with the same low-order bits. Thus, no recall is issued until valid directory information is obtained from main memory. Likewise, if a local snoop determines that the owner cell is caching the data privately, no recall is issued.

In mode B, fast directory FD0 is divided into two mutually exclusive and separately indexed sections, one of which holds directory information about private data, while the other holds directory information about public data used by cells other than the owner cell. Since it does not require a state bit, the private section requires only the three site bits. However, since computers utilize powers of two efficiently, the fourth bit is devoted to a 1-bit "partial tag". The value at this 1-bit tag position matches what would be the least-significant bit of a full tag. In other words, it is the least significant bit not used for indexing the directory cache. The incomplete tag is used to prevent false recalls for addresses that do not match the tag bit.

The public section basically replicates the eight site bits of the main directory, with the qualification that the self-referencing code 00000001 indicates an empty directory cache location rather than sole caching by the owner cell. By using unencoded site bits, the public section permits well-targeted predictive recalls to be issued in the event of a true hit. For fast directory FD0 in mode B, each section has a 512 kB capacity. The private section allocates this capacity among 1M directory locations, while the public section allocates this capacity to represent 512K directory locations. This allocation is reasonable since, in most cases, reads of private data are requested more frequently than writes of shared data.

Figure 3:
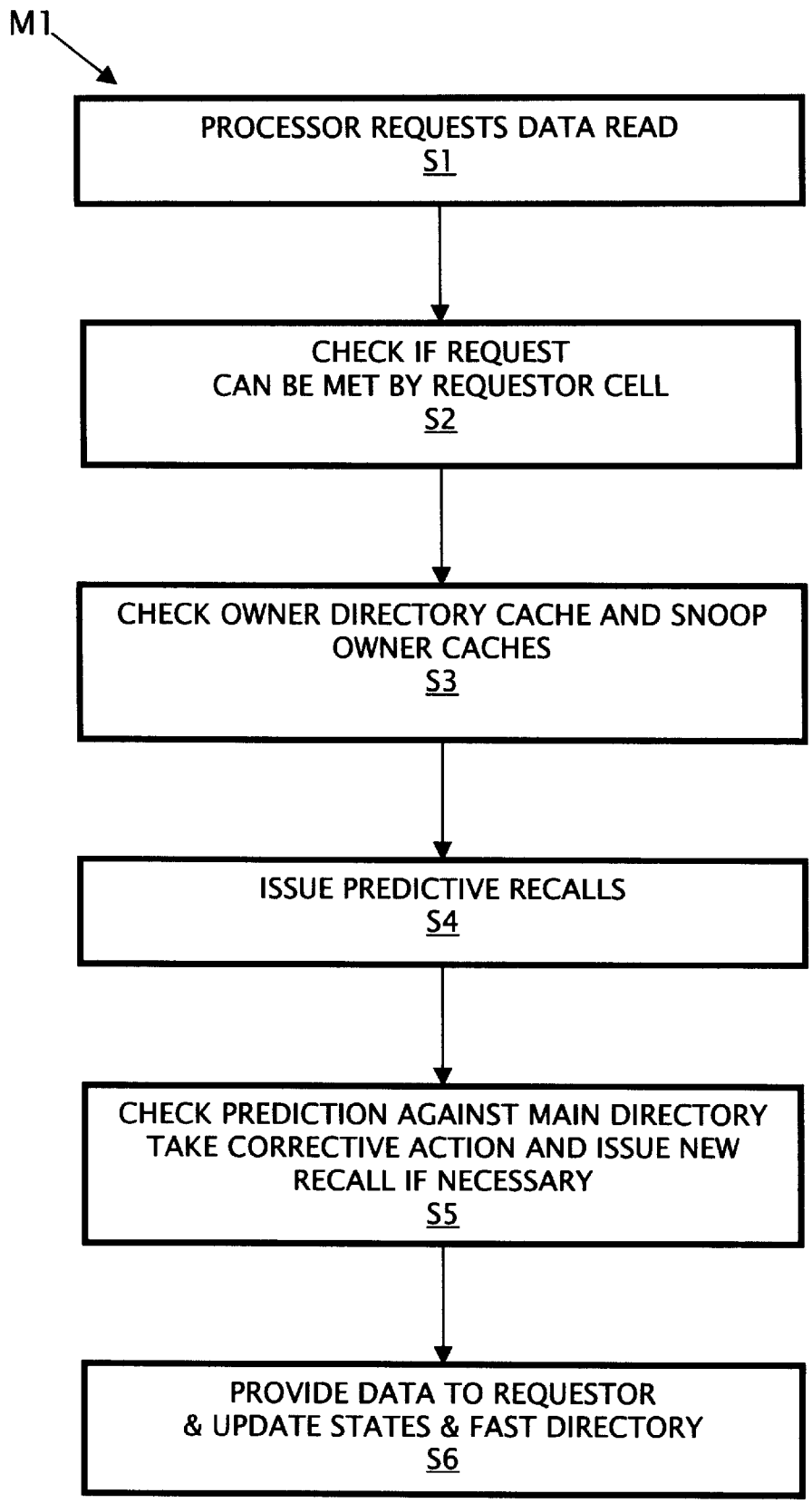
FIG. 3 is a flow chart of a method of performing a read operation in the system of FIG. 1.

A flow chart of the basic method M1 of handling a data request is flow charted in FIG. 3. At step S1, processor P11 issues a read request of data stored in main memory MM0. At step S2, caches C10–C13 of requester cell MC1 are examined to determine if the request can be met locally. First, associated cache C11 is checked. A hit allows the request to be met locally. A miss refers the request to the requestor's coherency controller CC1. Coherency controller CC1 initiates a local snoop while referring the request to owner cell MC0. If the snoop results in a hit, the request can be met locally. If the data is held privately by another local processor, e.g., processor P12, coherency controller requests that the data be made public so that the request can be met. Only if the local snoop misses is involvement of the owner cell MC0 required.

At step S3, coherency controller CC0 of owner cell MC0 initiates a local snoop of its caches, accesses fast directory FD0, and initiates access of main memory MM0. Coherency controller CC0 determines whether or not the fast-directory data calls for a recall and whether the directory cache data is consistent with the local snoop results. If the directory data is consistent with the snoop results and if a recall is indicated, it is initiated at step S4.

Coherency controller receives main-memory directory information at step S5. If a recall was issued, it compares the main-directory data with the fast-directory data. If the directory data are inconsistent, corrective action is taken. This can involve initiating new recalls and restoring states changed in response to the predictive recalls.

Once the recall process is complete, the requested data is transferred to the requester cell MC1, coherency controller CC1, cache C11, and processor P11, at step S6. State information in cache C11, fast directory FD0, and the coherency directory of main memory MM0 is updated as necessary. This completes method M1.

A write operation is similar to a read operation. In system AP1, a write request is implemented as a read-modify-write. In the case of write operation, data can be found locally and still other cells may need to be accessed. This is the case where the data is found to be public and shared so that a recall of the data from the cells sharing the data is required. The fact that the requester cell has a copy of the data can be conveyed to the owner cell. The owner coherency controller can use this information along with snoop information from its own cell to check the validity of directory cache data and thus avert a superfluous recall.

The foregoing description of a two-way sectioning of a fast directory can be extended to any number of sections. Each doubling of the number of sections provides a one-bit reduction in the number of bits that need to be stored in the directory. For example, an eight-section fast directory includes one section for each of eight cells. Each directory location can be two bits wide. The two bits can distinguish up to four states: for example, 1) not cached, 2) cached privately, 3) cached publicly and unshared, and 4) cached publicly and shared. The distinction between shared and unshared data can be used for verification purposes to help reduce the number of superfluous recalls. One section would be self referential and so could be eliminated or used for some specialized purpose.

It is also possible to store only one bit per location in a fast directory. That bit indicates whether or not a recall is to be issued to the cell corresponding to the section holding the bit. The recall can be general purpose. For example, the recall can be interpreted to mean invalidate the data whether it is shared or private.

Alternatively, a single signal could be interpreted based on the state of the data in the cache. A recall could mean, for example, "if the data is held publicly, invalidate it; if the data is held privately, make it public". Successful recalls would hasten read operations and write operations of formerly public data. Write operations of formerly private data would require another recall once the main-directory information is retrieved. However, some time saving would have accrued since the data would have been made public already.

If speculatively converting private data to public is too drastic an action to take based on a predictive recall, the recall can be interpreted to convert private dirty data to private clean. Then, at least, main memory would have an up-to-date copy of the data if it needs to be forwarded to the requestor cell.

Clearly, there are many possible ways of limiting the data stored in the fast directory. The foregoing description teaches how state bits and tag bits can be reduced in number or even omitted from the fast directory. In addition, the number of site bits can be reduced by encoding and/or by grouping cells. These and other variations upon and modifications to the described embodiments are provided for by the present invention, the scope of which is defined by the following claims.

What is claimed is:

1. A distributed-memory multiprocessor system with directory-based cache coherency, said system comprising:

plural memory cells communicatively coupled to each other and collectively including plural processors, user-data caches, main memories, fast coherency directories, and coherency controllers;

each of said cells including at least one of said processors, at least one of said caches, one of said coherency controllers, one of said main memories, and one of said fast coherency directories;

each of said main memories storing user data and including a main coherency directory that presents coherency information;

each of said fast coherency directories storing incomplete tags;

each of said coherency controllers responding to requests for data by accessing its respective fast coherency directory and its respective main coherency directory concurrently so that predictive recalls based on information retrieved from said fast coherency directory can be initiated before the corresponding information is retrieved from said main coherency directory.

2. A distributed-memory multiprocessor system with directory-based cache coherency, said system comprising:

plural memory cells communicatively coupled to each other and collectively including plural processors, user-data caches, main memories, fast coherency directories, and coherency controllers;

each of said cells including at least one of said processors, at least one of said caches, one of said coherency controllers, one of said main memories, and one of said fast coherency directories;

each of said main memories storing user data and including a main coherency directory that presents coherency information;

each of said fast directories being a cache with ambiguous mappings to main memory locations, said fast coherency directories storing site information without state information;

each of said coherency controllers responding to requests for data by accessing its respective fast coherency directory and its respective main coherency directory concurrently so that predictive recalls based on information retrieved from said fast coherency directory can be initiated before the corresponding information is retrieved from said main coherency directory.

3. A distributed-memory multiprocessor system with directory-based cache coherency, said system comprising:

plural memory cells communicatively coupled to each other and collectively including plural processors, user-data caches, main memories, fast coherency directories, and coherency controllers;

each of said cells including at least one of said processors, at least one of said caches, one of said coherency controllers, one of said main memories, and one of said fast coherency directories;

each of said main memories storing user data and including a main coherency directory that presents coherency information;

each of said fast coherency directories being a cache with ambiguous mappings to main memory locations, each of said fast coherency directories being updated in accordance with a caching algorithm that takes the coherency information to be cached into account;

each of said coherency controllers responding to requests for data by accessing its respective fast coherency directory and its respective main coherency directory concurrently so that predictive recalls based on information retrieved from said fast coherency directory can be initiated before the corresponding information is retrieved from said main coherency directory.

4. A method of handling a read request from a processor in a distributed-memory multi-processor system, said method comprising:

a) a processor issuing a read request;

b) meeting the request within the cell containing the requesting processor, otherwise proceeding with step c;

c) accessing a fast coherency directory of an owner cell to retrieve fast-coherency-directory information therefrom and issuing a recall if said fast-coherency-directory information indicates that the data is privately held;

d) accessing a main coherency directory to retrieve main-coherency-directory information therefrom and using said main-coherency-directory information to check said fast-coherency-directory information; and e) providing the requested data to said processor and updating the fast coherency directory.

5. A method as recited in claim 4 wherein, in step c, said recall is predictive, and in step d, initiating corrective action if the recall prediction fails.

6. A method as recited in claim 4 wherein said fast coherency directory is updated in part as a function of the contents of directory data to be stored in said fast coherency directory.

* * * * *